United States Patent

Kossen et al.

[15] 3,641,396

[45] Feb. 8, 1972

[54] ELECTRICALLY ACTUATED SWITCH COMBINATED OPERATING DEVICE FOR PERMITTING OPERATION OF LATCHES AND OTHER MECHANISMS

[72] Inventors: Dale J. Kossen, Orange; Richard W. Foster, Glendale; Charles R. Benson, Costa Mesa, all of Calif.

[73] Assignee: Alarm Lock Company, Inc., Los Angeles, Calif.

[22] Filed: May 21, 1970

[21] Appl. No.: 39,470

[52] U.S. Cl. ....................317/134, 70/278

[51] Int. Cl. ....................E05b 49/00

[58] Field of Search ....................317/134; 70/278

[56] References Cited

UNITED STATES PATENTS

| | | | |
|---|---|---|---|
| 3,513,357 | 5/1970 | Dittmore | 317/134 |
| 3,321,673 | 5/1967 | Wolfe | 317/134 |

*Primary Examiner*—William M. Shoop, Jr.
*Assistant Examiner*—Harry E. Moose, Jr.
*Attorney*—Mahoney, Hornbaker & Schick

[57] ABSTRACT

A plurality of normally off, pushbutton secure switches are located at an outer side and a same plurality of presettable, multiple positionable, secure switches are located at an inner side of a door guarded by a latch, with the first nonsecure switch being electronically connected through a set-reset flip-flop to the first position of all of the secure switches, the second nonsecure switch through a set-reset flip-flop to the second position of all of the secure switches and so forth. The output of each of the secure switches is connected to the input of an AND gate and the output of all of the AND gates are connected to the inputs of an OR gate, with the output of the OR gate and the other inputs of all of the AND gates being connected to an electronic counter formed by a plurality of toggle or clocked flip-flops. The output of the counter is connected through an AND gate of an electric solenoid circuit which is normally blocked from actuating the solenoid by a transistor, the transistor when driven to a conducting state permitting actuation of the solenoid. A timer circuit, including inverters, transistors, and AND gate, and other electronic components, is connected to the inputs of all of the secure switches through an OR gate and is also connected to the counter beginning an electronic timing upon predetermined correct momentary operation of one of the nonsecure switches to limit the total amount of time that the nonsecure switches can be correctly operated in proper sequence to finally permit energization of the electric solenoid. Thus, with the electrical circuitry including the electronic components, the secure switches may be set to any combination of multiple settings which determines the required sequence of operations of one or more of the nonsecure switches, the secure switches in their connection in the circuit requiring transmission therethrough in order or sequence. In the sequence of operation of the nonsecure switches does not follow the order of secure switches, the entire circuitry is reset to starting position including the timer circuit and if the time period of the timer circuit expires the entire circuitry is reset, thereby requiring exact operation of the nonsecure switches within a determined time period in order to energize the solenoid. The solenoid is mounted blocking operation of the latch guarding the door so that when the solenoid is energized, the latch can be operated and the door opened.

14 Claims, 4 Drawing Figures

INVENTORS.
DALE J. KOSSEN
RICHARD W. FOSTER
CHARLES R. BENSON
BY MAHONEY, HORNBAKER
AND SCHICK
ATTORNEYS

INVENTORS.
DALE J. KOSSEN
RICHARD W. FOSTER
CHARLES R BENSON
BY MAHONEY, HORNBAKER
AND SCHICK
ATTORNEYS

ELECTRICALLY ACTUATED SWITCH COMBINATED OPERATING DEVICE FOR PERMITTING OPERATION OF LATCHES AND OTHER MECHANISMS

BACKGROUND OF THE INVENTION

Our invention relates to an electrically actuated switch combinated operating device for permitting operation of latches and other mechanisms, thereby constituting an electrically actuated and electrically controlled form of combination lock which may be used for guarding virtually any electrically actuated device and upon proper switch operation thereof according to a predetermined combination of such operation, may permit actuation of the electrically actuated device. Thus, as an example of one of the major uses of the operating device of the present invention, the device may include an electric solenoid which is permitted to be energized when the operating device is properly combinated and energization of the solenoid unblocking and permitting operation of a door or cabinet latch. Furthermore, the operating device of the present invention may be fabricated in many relatively sophisticated or relatively simple forms according to the particular security demands for the particular installation thereof and the required combinated operation of any of such forms may be quickly and conveniently changed at any time without replacement of parts of the operating device and without disassembly thereof.

Various types of locks have heretofore been installed for guarding the operation of door and cabinet latches against surreptitious operation and entrance or access by unauthorized people. Probably the two major types of locks used for these purposes are those which are key operated and those which are combination operated, the major difficulty with both types being the extreme difficulty of altering the same for requiring a different key or different combination in the event the original key or combination falls into unauthorized hands. For instance, with the key-operated locks if the same lock is to be retained, it is necessary to virtually completely disassemble the same to change the usual pins in the cylinders thereof, and with the usual form of combination locks, it is also necessary to virtually completely disassemble the same in order to change the tumbler arrangement therein so that in many cases, it is more practical to install completely new locks despite the obvious expense thereof.

One of the more common uses of key-operated locks where the problem of key changes is particularly acute is in hotels and motels. Obviously, it is necessary to supply the particular room occupant with keys to that room and in many cases such keys are either lost or carried away by the occupant when leaving the hotel or motel accommodation. Although some such keys are properly returned, there are many instances where such keys fall into unauthorized hands and the keys or copies thereof are later used to gain unauthorized entrance to such rooms for purposes of criminal activities. Thus, if maximum guest security is to be provided by the hotels and motels, it is necessary to make frequent changes in the various room locks so that different keys are required.

Still another major use of key-operated locks is in the required secure areas of industrial plants and governmental bodies where even the bulk of the personnel of that particular plant or governmental body is not permitted in such secure area, but only certain authorized personnel are so permitted. Again, unless the entrances to such areas are constantly guarded by security guards, each of the authorized persons must be provided with the necessary keys for gaining entrance to the same. The problem of lock alterations or changes, therefore, arises when either an employee loses or misplaces his particular key or when one of these authorized persons leaves the employ of that particular industrial plant or governmental body for the purpose of other employment, it being impossible to determine whether copies of the required keys might have been made or whether the misplaced or lost keys might fall into unauthorized hands resulting in lock alterations or changes being virtually mandatory.

Also, within the above security areas of industrial plants and governmental bodies, it is quite common to use combination lock-guarded filing vaults, safes, and cabinets. The combinations of such locks must be supplied to the authorized personnel carrying out the day-to-day business and other activities even though that personnel might be quite restricted in number. Thus, when there is any employee change, the security requirements dictate that all of the combination locks must be altered so that new combinations are required, again involving all of the problems hereinbefore discussed.

OBJECTS AND SUMMARY OF THE INVENTION

It is, therefore, an object of our invention to provide an electrically actuated switch combinated operating device for permitting operation of latches and other mechanisms wherein by operation of a plurality of nonsecure switches in an area exposed to a person seeking to operate the device in an exact manner as determined by a plurality of secure switches presettable in a determined fashion and located in an area not exposed to such person, electrical energization of an operating device is permitted. Thus, the electrically actuated switch combinated operating device of the present invention constitutes an electrically actuated combination lock and the electrically actuated operating device may be virtually any device used for guarding virtually any other operable mechanism. For instance, the operating device may be an electric solenoid installed guarding operation of a door latch so that by proper operation of the nonsecure switches by a person seeking to enter a secure area through such door will permit electrical energization of the solenoid to unblock the door latch and permit latch operation for opening the door. Thus, the electrically actuated combination lock of the present invention may be installed for a replacement of virtually any conventional key-operated or combination-operated lock.

It is another object of our invention to provide an electrically actuated switch combinated operating device for permitting operation of latches and other mechanisms which is of the foregoing general type and may be constructed for permitting the selection of virtually any number of combinations, that is, required nonsecure switch predetermined operations, that may be required or desired. The total number of combinations from which any one combination may be chosen is dependent on the number of presettable positions incorporated in each of the secure, presettable switches, the numbers of such switches and other factors including whether or not the electrical or electronic components of the device are arranged for requiring a particular sequential or merely a nonsequential operation of the nonsecure switches. As a result, therefore, the sophistication of the operating device of the present invention may be virtually any degree dependent on the required uses thereof, while still remaining within the broad principles herein involved.

It is still a further object of our invention to provide an electrically actuated switch combinated operating device for permitting operation of latches and other mechanisms which is of the foregoing general type and with which the required combination of operating the nonsecure switches may be quickly and easily changed to a different combination in a very short period of time and without any disassembly of the operating device or the replacement of any parts thereof. The only requirement for changing the operating combination of the operating device of the present invention is accessibility to the secure switches which are located within the particular secure area, such accessibility, for instance, being provided by an otherwise locked box or cabinet. Merely by repositioning the secure switches to different settings, or even the repositioning of only one of such secure switches, will change the combination operation of the nonsecure switches, thereby completely eliminating the major problems with the prior key-operated and combination-operated locks as hereinbefore discussed.

It is also an object of this invention to provide an electrically actuated switch combinated operating device for permitting operation of latches and other mechanisms having all of the foregoing attributes, yet the operation thereof may be restricted to a given time period so as to further frustrate unauthorized operation thereof. Again, dependent on the sophistication required, but not otherwise being dependent on the particular sophistication or simplicity of the overall operating device, a timer circuit may be incorporated therein which limits the time within which the operating device may be electrically energized at any one occasion. If maximum timing sophistication is desired, the timing circuit may be arranged to be energized or actuated upon correct operation of the first to be operated of the nonsecure switches so that the timing circuit will thereby limit the amount of time during which the remainder of the combinated operation may be carried out and the operating device electrically energized. In the simplest form, the timer circuit may be arranged to be actuated to give a timed period after correct operation of all of the nonsecure switches so as to merely limit the time within which the operating device may be electrically energized.

It is an additional object of our invention to provide an electrically actuated switch combinated operating device for permitting operation of latches and other mechanisms satisfying all of the above objects in an efficient manner and which may be provided in relatively small, compact size and may be produced at a minimum of comparative cost. With the use of modern electrical and electronic components, all of the electrical circuitry and electronic components may be of miniaturized type requiring a minimum of space and yet maximum ease of fabrication. In comparison with the prior key-operated or combination-operated locks therefore, the equivalent or greater security may be provided by the device of the present invention and at competitive costs, particularly considering the convenience and lack of expense in combination changing in order to provide renewed security for the particular mechanisms being guarded.

DESCRIPTION OF THE BEST EMBODIMENT CONTEMPLATED

The broad principles of the electrically actuated switch combinated operating device of the present invention for permitting operation of latches and other mechanical and/or electrical mechanisms involves the comparing through electrical circuitry of a plurality of nonsecure switches exposed to a nonsecure area and capable of being variably set or operated to a plurality of exactly preset secure switches located in a normally nonaccessible secure area and when the electric circuitry determines that the operation of the nonsecure switches is the same or correct as determined by the presettings of the secure switches, electrical power is permitted to reach an operating device which, in turn, may permit the operation of various forms of mechanisms, for instance, door latches and the like. With the presettable secure switches having the capability of presetting thereof each to any selected of multiple positions, the required setting or positioning of the nonsecure switches may be varied from time to time so that the electrically actuated switch combinated device of the present invention constitutes the equivalent of an electrically actuated combination lock. Furthermore, in certain more sophisticated forms of the present invention, including that illustrated and described herein, various electronic components may be incorporated in the electrical circuitry thereof requiring the nonsecure switches to be operated in a predetermined particular sequence in order to accomplish the overall combination setting and permit electrical power to be directed to the operating device, the electrical circuitry with said electronic components also preferably sensing any lack of sequential operation of the nonsecure switches and returning all of the circuitry to original condition or state in the event such nonsequential nonsecure switch operation takes place to thereby even further frustrate any attempts at unauthorized manipulation of the device of the present invention. To add even further sophistication to this sophisticated form, or to add sophistication to simpler forms, the electrical circuitry may still further include timing means limiting the period of time during which electrical power may be permitted to be directed to the operating device, in the simpler forms, the timing means starting time measurement upon completion of the correct combination setting by the nonsecure switches and in the more sophisticated forms, the timing means commencing the time period measurement upon the first correct combination setting of the first to be operated or set nonsecure switch.

Figure 1:
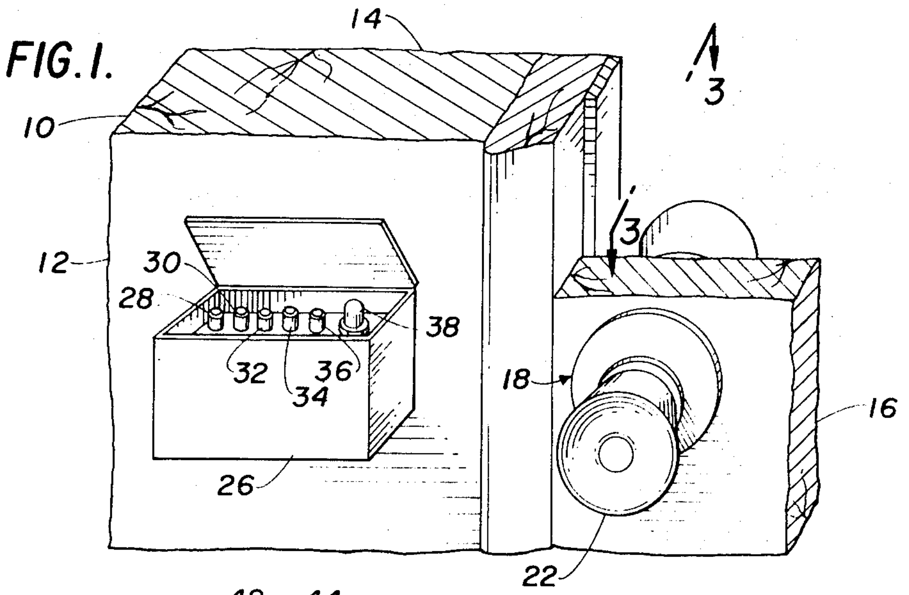
FIG. 1 is a fragmentary, perspective view of a conventional door latch mounted in a door and representative of a wall enclosure separating a nonsecure area from a secure area and with the door latch being guarded by an embodiment of the electrically actuated switch combinated operating device of the present invention, the nonsecure portion of the operating device being exposed at the outer side of the closure.

More particularly to the embodiment of the electrically actuated switch combinated operating device of the present invention illustrated herein, FIG. 1 of the drawings shows a conventional wall 10 defining a nonsecure area at an outer nonsecure side 12 thereof and a secure area at an inner secure side 14 thereof, the inner secure side being accessible through a conventional door 16 capable of being opened, but normally guarded closed by a door latch mechanism generally indicated at 18. The door latch mechanism 18 may be of virtually any conventional form with the exception of being guarded against actuation or operation for withdrawal of a bolt 20 through partial rotation of an outer doorknob 22 by an electrically actuated solenoid generally indicated at 24 and forming the end operating device of the device of the present invention. The electrically actuated solenoid 24 may be arranged in the door latch mechanism 18 in various manners, usually depending on the particular construction of the door latch mechanism, but in all cases, the solenoid in nonelectrically actuated condition effectively blocks in some manner operation of the door latch spindle (not shown) by the outer doorknob 22 and/or withdrawal of the bolt 20, in this case, the solenoid 24 in nonactuated condition effectively blocking operation of the spindle by the outer doorknob and, thereby, blocking withdrawal of the bolt.

Figure 2:
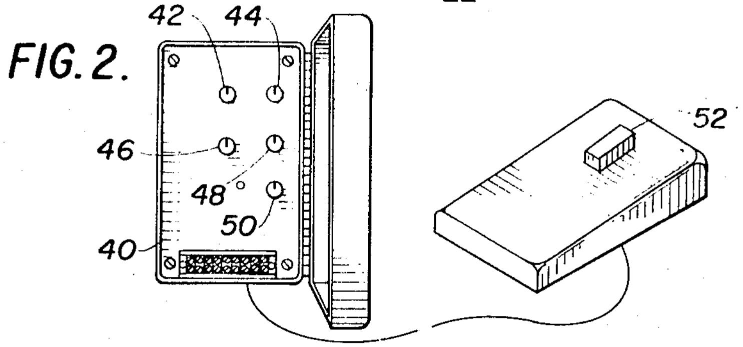
FIG. 2 is a similar view of the secure portion of the electrically actuated switch combinated device of the present invention as would be installed within the secure area.

Returning to FIG. 1, the embodiment of the device of the present invention includes a nonsecure control box 26 mounted on the outer nonsecure side 12 of the wall 10 adjacent the door 16 and the door latch mechanism 18 containing a plurality of five momentarily operable, nonsecure switches 28, 30, 32, 34 and 36, and a signal light 38. As shown in FIG. 2, a secure control box 40 contains a plurality of five selectively presettable, five-position, secure switches 42, 44, 46, 48 and 50 and this secure control box is mounted at the inner secure side 14 of the wall 10 (FIG. 1) containing the major portion of the electrical circuitry and electronic components of the device, but being electrically connected through the electrical circuitry to the nonsecure switches 28 through 36 of the nonsecure control box 26, all of which will be hereinafter described more in detail. Also, a momentarily operable override switch 52 may be connected into the circuitry of the secure control box 40 and located in the secure area at the inner secure side 14 of the wall 10 for a purpose to be hereinafter described.

Figure 4:
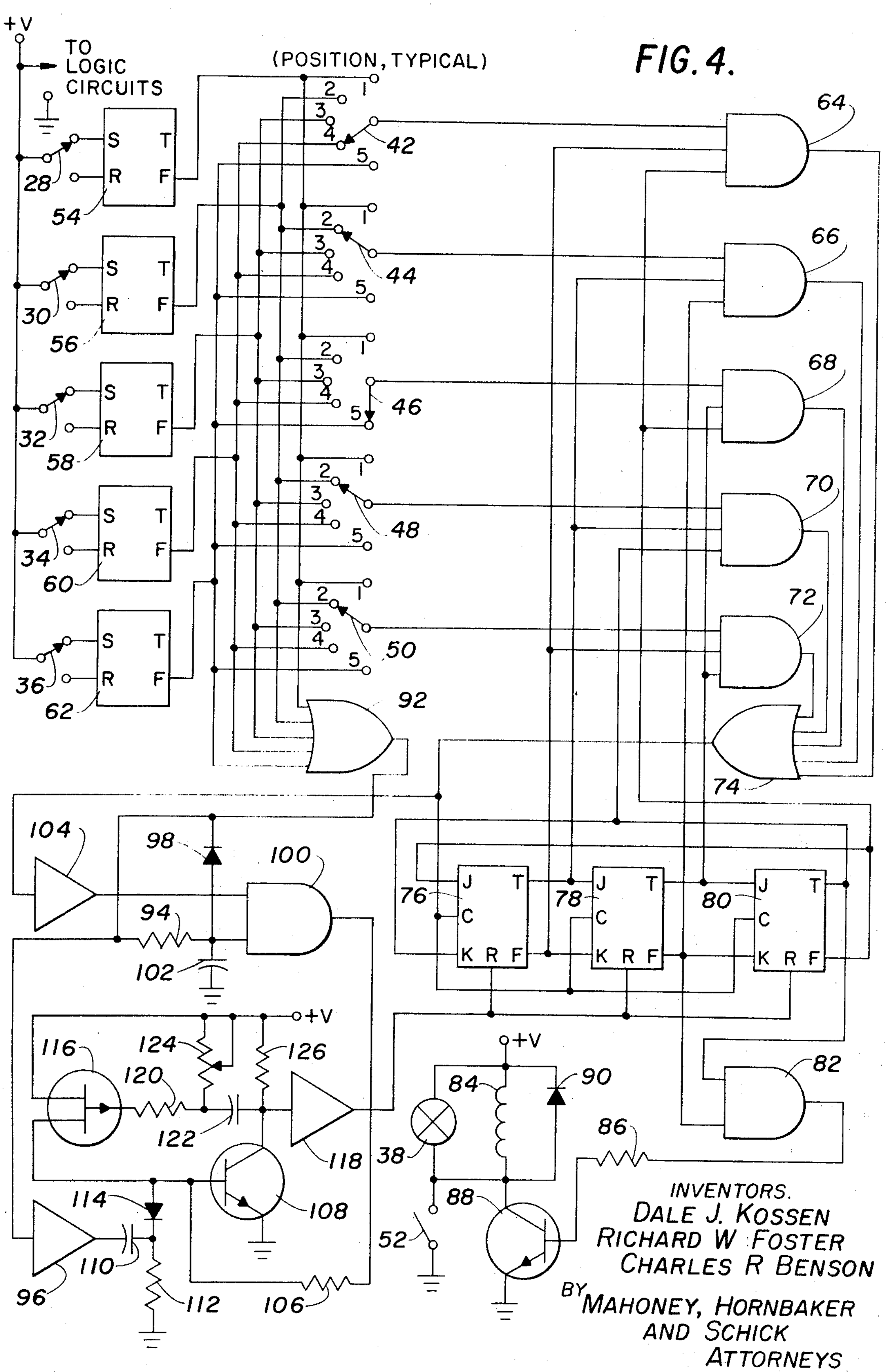
FIG. 4 is a circuit diagram of the operating device of the present invention.

The overall circuit diagram for the embodiment of the device of the present invention is shown in FIG. 4 and includes the inputs of the nonsecure switches 28 through 36 connected to a positive direct current voltage which may be derived from rectified alternating current voltage or from a battery supply, the latter preferably being used where alternating current is not available or under emergency conditions where alternating current supply is temporarily interrupted. The outputs of the momentarily operable nonsecure switches 28 through 36 are respectively connected to set-reset flip-flops 54, 56, 58, 60 and 62, said nonsecure switches in nonoperative condition being directed to the set contacts of flip-flops 54 through 62 and when said nonsecure switches are operated being directed to the reset contacts of said flip-flops. False outputs of the set-reset flip-flops 54 through 62 are connected respectively to positions 1 through 5 of all of the multiple positionable, presettable, secure switches 42 through 50, that is, the false output of the set-reset flip-flop 54 is connected to position 1 of each of the secure switches 42 through 50, the false output of the set-reset flip-flop 56 is connected to position 2 of each of the secure switches 42 through 50, and so forth, with the positions 1 through 5 of the secure switches constituting the inputs thereof.

The single outputs of each of the secure switches 42 through 50 are respectively connected to AND-gates 64, 66, 68, 70 and 72, that is, the single output of the secure switch 42 is connected to one of the inputs of the AND-gate 64, the single output of the secure switch 44 is connected to one of the inputs of the AND-gate 66, and so forth. The outputs of the AND-gates 64 through 72 are all connected to the inputs of an OR-gate 74 and the output of the OR-gate 74 is connected to each clock input of three toggle or clocked flip-flops 76 through 80, said clocked flip-flops effectively forming a counter. Other inputs of AND-gates 64 and 72 are both connected to a false output of the clocked flip-flop 76 and a K-input of the clocked flip-flop 78, other inputs of the AND-gates 64 and 68 are both connected to a J-input of the clocked flip-flop 76 and a false output of the clocked flip-flop 80, other inputs of the AND-gates 66 and 70 are both connected to a true output of the clocked flip-flop 76 and a J-input of the clocked flip-flop 78, another input of the AND-gate 66 is connected to a false output of the clocked flip-flop 78 and a K-input of the clocked flip-flop 80, and other inputs of the AND-gates 68 and 72 are both connected to a true output of the clocked flip-flop 78 and a J-input of the clocked flip-flop 80.

The false output of the clocked flip-flop 78 and the K-input of the clocked flip-flop 80 are both connected to an input of an AND-gate 82 and another input of the AND-gate 82 is connected to the true output of the clocked flip-flop 80, with the output of the AND-gate 82 being connected to the electrically actuated operating device circuit, that is, the circuitry including a coil 84 of the previously mentioned solenoid 24 which is normally positioned blocking the door latch mechanism 18. More particularly, the output of the AND-gate 82 is connected through a resistor 86 to a transistor 88, the transistor 88 firing when current is received from the AND-gate 82 through the resistor 86 and, in turn, transmitting current therethrough between one side of the solenoid coil 84 and ground. The same side of the solenoid coil 84 is connected through the previously described momentarily operable and normally off, override switch 52 to ground, the opposite side of the solenoid coil 84 being connected to positive direct current voltage, with both the previously mentioned signal light 38 in the nonsecure control box 26 and a diode 90 being connected across both sides of the solenoid coil 84.

In addition to the foregoing, the overall circuitry may include a timer circuit portion including an OR-gate 92 having five inputs thereof connected one each to each of the positions of all of the presettable secure switches 42 through 50, that is, one input connected to the first positions or inputs of each of the secure switches, another input connected to each of the second positions of the secure switches, and so forth. A single output of the OR-gate 92 is connected at one side of a resistor 94 to an input of an inverter 96 and through a diode 98 to the other side of the resistor 94, as well as to one input of an AND-gate 100 and through a capacitor 102 to ground. The output of the previously mentioned OR-gate 74 having the inputs thereof connected to the AND-gate 64 through 72 is also connected to an input of an inverter 104, the output of said inverter being connected to another input of the AND-gate 100 with an output of said AND gate being connected through a resistor 106 to a transistor 108.

An output of the inverter 96 is connected through a capacitor 110 and a resistor 112 to ground, and through said capacitor and a diode 114 to both the transistor 108 and a transistor 116. The transistor 108 is also connected to ground and an input of an inverter 118, and the transistor 116 is connected to a positive direct current voltage and through a resistor 120 and a capacitor 122 to the input of the inverter 118. Finally, a variable resistor 124 is connected from the positive direct current voltage to between the resistor 120 and the capacitor 122 and a resistor 126 is connected to the positive direct current voltage to between the capacitor 122 and the input of the inverter 118 with the output of the inverter 118 being connected to the resets of all of the previously described clocked flip-flops 76 through 80.

Briefly describing the functions of the various groups of components in the overall circuitry, to be followed by an example of operation of the embodiment of the present invention, as hereinbefore described, the momentarily operated nonsecure switches 28 through 36 are normally directed to the set inputs of the set-reset flip-flops 54 through 62 and when momentarily operated are directed to the reset inputs of said set-reset flip-flops, while the presettable, multiple positionable secure switches 42 through 50 may be selectively preset as desired to any one of five positions. The momentary switch 52 in the circuitry of the solenoid coil 84, as also previously pointed out, is normally open or off and is momentarily operable to closed or on.

More particularly to the electronic components of the overall circuitry, the set-reset flip-flops 54 through 62 are of the form wherein a logic 1 on the set input thereof sets the false output to a logic 0 and the true output to a logic 1, whereas a logic 1 on the reset input sets the false output to a logic 1 and the true output to a logic 0. The AND-gates 64 through 72, 82 and 100 are of the form wherein a logic 0 on any input will result in a logic 0 on the output, whereas a logic 1 on all inputs will result in a logic 1 on the output. The OR-gates 74 and 92 are of the form wherein a logic 1 on any input will result in a logic 1 on the output, whereas a logic 0 on all inputs will result in a logic 0 on the output.

The inverters 96, 104 and 118 in the timer portion of the circuitry are of the form wherein a logic 1 on the input will result in a logic 0 on the output and a logic 0 on the input will result in a logic 1 on the output. The toggle or clocked flip-flops 76, 78 and 80 forming the counter are of the form wherein a logic 1 on both J- and K-inputs and a logic 1 to logic 0 transition of the clock input will cause the true and false outputs to assume the opposite states that existed before the clock transition, whereas with a logic 1 on the J-input and a logic 0 on the K-input with a transition of the clock will cause the true output to go to or remain a logic 1 and the false output to go to or remain a logic 0. Still in the clocked flip-flops 76 through 80, with a logic 1 on the K-input and a logic 0 on the J-input with a transition of the clock, the false output will go to or remain a logic 1 and the true output will go to or remain a logic 0, while with a logic 0 on both the J- and K-inputs, neither output will change. A reset input to the clocked flip-flops 76, 78 and 80 will set the false output to a logic 1 and a true output to a logic 0 regardless of the J, K or clock inputs.

In the timer portion of the circuitry, the resistor 94, the diode 98 and the capacitor 102 form a delaying network to delay a logic 0 to a logic 1 transition with minimum delay for a logic 1 to a logic 0 transition. Furthermore, this timer circuitry forms a one-shot multivibrator timer. After firing or triggering of transistor 108, this transistor will remain off for several seconds, the time being determined by the variable resistor 124 and the capacitor 122, allowing the counter formed by the clocked flip-flops 76 through 80 to be incremented, and after the time constant has expired or after an input through the timer circuit resistor 106, the timer is reset which resets the counter.

Figure 3:
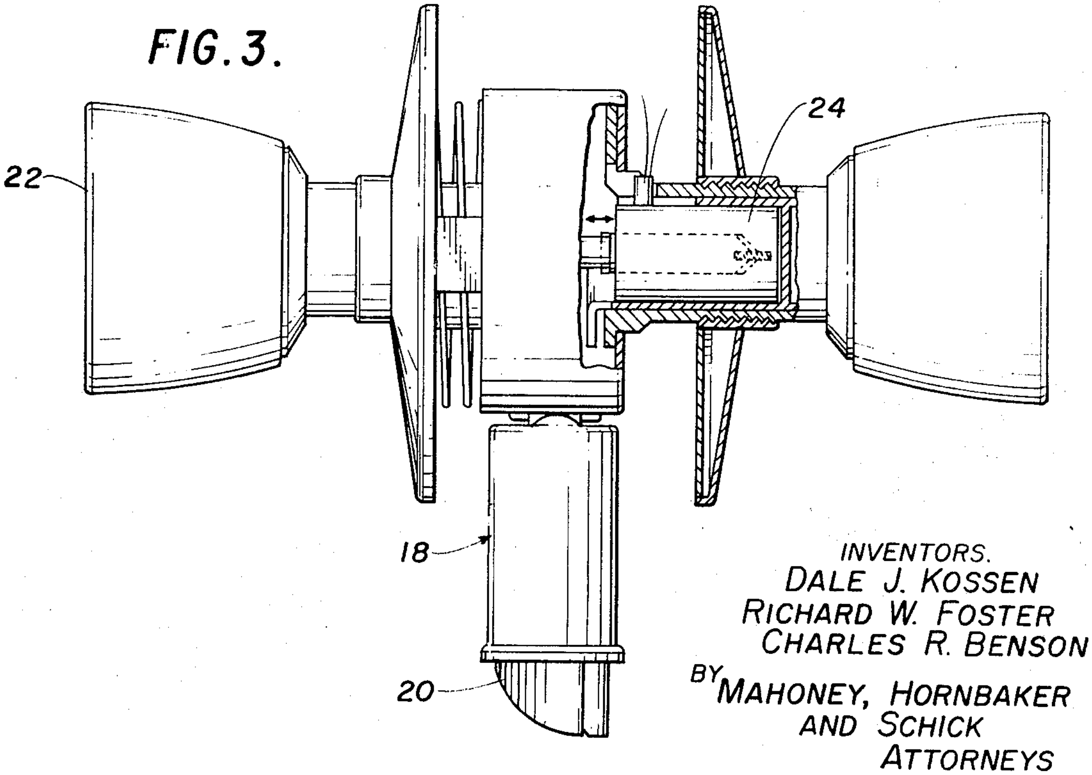
FIG. 3 is an enlarged, top plan view of the door latch of FIG. 1 looking in the direction of the arrows 3—3 in FIG. 1 and illustrating the adaption of a standard door latch for use with the electrically energized operating device of the present invention.

In the circuitry portion of the solenoid coil 84, the transistor 88, the resistor 86, the diode 90 and the signal light 38 with the solenoid coil 84 provide an output circuit which, when energized, permits withdrawal of the plunger of the solenoid 24 (FIG. 3), thereby permitting operation of the door latch mechanism 18 and withdrawal of the bolt 20 to open the door 16 (FIG. 1). When the transistor 88 is off, no current flows through the solenoid coil 84, the solenoid 24 continues to block the operation of the door latch mechanism 18 and the door 16 can not be opened, but when the counter formed by the clocked flip-flops 76 through 80 reaches the correct count, the AND-gate 82 will supply current through the resistor 86 to fire or trigger or turn on the transistor 88 and with such current flowing, the solenoid coil 84 is energized withdrawing the plunger of the solenoid 24 and permitting operation of the door latch mechanism 18. Also with the current flowing, the signal light 38 is illuminated at the nonsecure control box 26 exposed to the nonsecure area indicating that the solenoid 24 has been activated and the door latch mechanism 18 may be operated to open the door 16, the diode 90 in this circuitry acting as a suppressor to prevent high voltages when the transistor 88 is turned off or deactivated.

As an example of operation of the electrically actuated switch combinated operating device of the present invention as constituted by the embodiment shown and hereinbefore described, assume the presetting of the selectively preset, multiple positionable secure switches 42 through 50 is as shown in FIG. 4, that is, the secure switch 42 set to position 4, the secure switch 44 set to position 2, the secure switch 46 set to position 5, the secure switch 48 set to position 2, and the secure switch 50 set to position 2, thereby setting up a combination of 4–2–5–2–2 as related to the momentarily operated nonsecure switches 28 through 36 if said nonsecure switches are number 1 through 5 from top to bottom. In view of the setting of the top secure switch 42 to position 4, to start setting the combination, the fourth nonsecure switch 34 must be depressed momentarily which starts the timing of the timer circuit by a signal through the OR-gate 92, the inverter 96 and the differentiating circuit capacitor 110, diode 114 and resistor 112. Prior to this momentary operation of the fourth nonsecure switch 34, the timer circuit is applying a reset to the counter formed by the clocked flip-flops 76 through 80 and with a reset applied, the true outputs of the clocked flip-flops 76 through 80 is a logic 0 with the false outputs being a logic 1.

When the fourth nonsecure switch 34 is depressed, the timer formed by the timer circuit portion starts and a logic 1 is applied to the reset input of the set-reset flip-flop 60 setting a logic 1 on the false output of the set-reset flip-flop 60. The logic 1 of the false output of the set-reset flip-flop 60 appears at the input of the AND-gate 64 through position 4 of the secure switch 42. At this time, the counter formed by the clocked flip-flops 76 through 80 has not been incremented and the false outputs of clocked flip-flops 76 and 80 are a logic 1, so that with the appearance of the logic 1 at the input of the AND-gate 64 from the secure switch 42, all three inputs of the AND-gate 64 are a logic 1 and the output of this AND-gate 64 goes to a logic 1 being gated through the OR-gate 74 to the clock inputs of the counterclocked flip-flops 76 through 80.

When the fourth nonsecure switch 34 is then released, a logic 1 is applied to the set input of the set-reset flip-flop 60 setting the true output to a logic 1 and the false output to a logic 0. Further, when this logic 0 appears at the input to the AND-gate 64 from the secure switch 42, the output of the AND-gate 64 goes to a logic 0 and the clocked input through the OR-gate 74 of the counterclocked flip-flops 76 through 80 goes to a logic 0. This transition toggles the outputs of the clocked flip-flop 76 to the opposite state so that the true output is logic 1 and the false output is logic 0, thereby completing setting of the first combination number.

The next combination number which, with the sophisticated form of the device of the present invention herein involved must follow an exact sequence, is 2 as determined by the positioned setting 2 of the secure switch 44 so that the second nonsecure switch 56 is depressed setting the false input of the set-reset flip-flop 56 to a logic 1 with this logic 1 appearing at the input of the AND-gate 66 through the secure switch 44. At this time, the true output of the clocked flip-flop 76 is a logic 1 and the false output of the clocked flip-flop 78 is a logic 1. With all inputs of logic 1 at the AND-gate 66, the output of the AND-gate 66 will be a logic 1 and will appear at the clock inputs of the clocked flip-flops 76 through 80.

Releasing the second nonsecure switch 56 will then remove the logic 1 from the inputs of the AND-gate 66 and will cause the clock input of the clocked flip-flops 76 through 80 to go to a logic 0. This transition will set the true output of the clocked flip-flop 78 to a logic 1, while the clocked flip-flops 76 and 80 will both remain in their previous state, thereby completing setting of the second combination number 2.

The next combination number 5, as determined by the setting of the secure switch 46 to the position 5 requires the depressing next of the fifth nonsecure switch 36 setting the false output of set-reset flip-flop 62 to a logic 1 and this logic 1 will appear at the input of the third AND-gate 68 through the secure switch 46. At this time, the true output of the clocked flip-flop 78 will be a logic 1 and the false output of the clocked flip-flop 80 will be a logic 1 resulting in a logic 1 at the clock input to all of the clocked flip-flops 76 through 80. Thus, when the presently being operated nonsecure switch 32 is released, the clock inputs to the clocked flip-flops 76 through 80 will go to a logic 0 and the transition will set the true output of the clocked flip-flop 80 to a logic 1, while the clocked flip-flops 76 and 78 will remain in their previous states thereby completing setting of the third combination number 5.

The next in sequence combination number 2 again requires the depressing of the second nonsecure switch 30 which will set the false output of the set-reset flip-flop 56 to a logic 1 which will appear at the input of the fourth in line AND-gate 70 through the fourth in line secure switch 48, and at this time, the true outputs of the clocked flip-flops 76 and 80 will be a logic 1 resulting in a logic 1 at the clock inputs of all of the clocked flip-flops 76 through 80. Releasing the nonsecure switch 56 will result in a logic 0 at the clock inputs of the clocked flip-flops 76 through 80 and this transition will toggle a logic 1 to the false output of the clocked flip-flop 76 while the clocked flip-flops 78 and 80 remain in their previous state. This completes the fourth in sequence combination number setting or the setting of the number 2.

The last combination number in sequence is also 2 so that the second nonsecure switch 30 is again depressed which will set the false output of the set-reset flip-flop 54 to a logic 1 which will appear at the input of the fifth in line AND-gate 72 through the fifth in line secure switch 50. At this time, the false output of the clocked flip-flop 76 and the true output of the clocked flip-flop 80 will be a logic 1 which will result in a logic 1 at the clock input of all of the clocked flip-flops 76 through 80. Releasing the nonsecure switch 30 will then result in a logic 0 at the clock inputs of all of the clocked flip-flops 76 through 80 and this transition will toggle a logic 1 to the false output of the clocked flip-flop 78 while the clocked flip-flops 76 and 80 will remain in their previous states. This completes the setting of the proper combination 4–2–5–2–2.

The result is that when the clocked flip-flop 78 toggles, a logic 1 will appear at the output of the AND-gate 82 since the true output of the clocked flip-flop 80 is a logic 1 and the output of the AND-gate 82 will fire or drive the transistor 88 in the circuit of the solenoid coil 84. The firing or driving of the transistor 88 places it in a conducting state and causes a flow of electrical power through the solenoid coil 84 and the signal light 38. Energization of the solenoid coil 84 withdraws the plunger of the solenoid 24 from its blocking position in the door latch mechanism 18 and permits the door latch mechanism to be operated for opening the door 16.

When the time constant on the previously described timer formed by the timer circuit portion expires, such time constant being determined by the variable resistor 124 and the capacitor 122, transistor 108 is fired or driven so as to conduct and cause actuations of the resets of the clocked flip-flops 76 through 80 resetting these clocked flip-flops to their original state. This sets the true output of the clocked flip-flop 80 to a logic 0 and removes the drive to the transistor 88 in the circuit of the solenoid coil 84. Lack of energization of the solenoid coil 84 permits the plunger of the solenoid 24 to once again block the door latch mechanism 18 so that the door 16 can not then be opened. To again energize the solenoid coil 84, the entire combination sequence of manipulation of the nonsecure switches 28 through 36, that is, the proper ones thereof in proper sequence, must be repeated so that at any time after proper operation of the first of the nonsecure switches 28 through 36 as determined by the presetting of the secure switches 42 through 50, the time constant expires, the clocked flip-flops 76 through 80 will automatically be reset and the entire combination must be carried out despite the previous advancement at that particular moment.

Also, if a wrong one of the nonsecure switches 28 through 36, that is a wrong one and out of its particular required sequence as determined by the presetting of the secure switches 42 through 50, is depressed at any time, the timer formed by the timer circuit portion will be reset which will, in turn, cause a resetting of the counter formed by the three clocked flip-flops 76 through 80 returning everything to the original state and again causing a restarting from the beginning of the combination manipulation. More particularly, when any of the nonsecure switches 28 through 36 is depressed, a logic 1 appears at the output of the OR-gate 92 and appears slightly delayed, by the resistor 94 and the capacitor 102, at the input of the AND-gate 100. When any wrong switch of the nonsecure switches 28 through 36 is depressed, that is a wrong switch in the predetermined sequence, the output of the OR-gate 74 will remain a logic 0 and a logic 1 will appear at the output of the inverter 104. With both inputs a logic 1 to the AND-gate 100, the output thereof will be a logic 1 causing current to flow through the resistor 106 and reset the timer, thereby resetting all of the clocked flip-flops 76 through 80 and returning everything to its original state.

Thus, with the relatively sophisticated electrical circuitry including electronic components herein shown and described providing a relatively sophisticated form of the electrically actuated switch combinated operating device of the present invention, not only must the proper of the nonsecure switches 28 through 36 be manipulated or operated, but these nonsecure switches must be operated in an exact sequence and if any is operated out of that sequence, even though it may form a part of the combination, the entire circuitry will be reset to its original state frustrating or preventing the carrying out of the combination operation and the release of the door latch mechanism 18 for opening the door. Additionally, with the timer formed by the timer circuit portion of the overall circuitry and as described, only a determined time period is permitted from the operation of the first combination number and the total time within which the door latch mechanism 18 must be operated to open the door 16. If, at any time during the operation of the various nonsecure switches 28 through 36 even though the correct combination is being placed, or even after the entire correct combination has been placed and the solenoid coil 84 has been energized, this time period expires, the entire circuitry is immediately returned to its original state deenergizing the solenoid coil 84 and requiring a complete resetting of the entire combination in proper sequence before the solenoid coil 84 is again energized.

As hereinbefore pointed out, the override switch 52 of the electrical circuitry, as shown in FIG. 2 and the circuit diagram of FIG. 4, is placed, if provided, at some location within the secure area and may be used to override the circuitry of the device and energize the solenoid coil 84 to permit opening of the door 16. For instance, where an authorized guard is positioned within the secure area at the inner secure side 14 of the wall 10 and can view persons approaching the door 16 within the nonsecure area or at the outer nonsecure side 12 of the wall, if the person is an authorized person as recognized by the guard, the guard can momentarily depress the override switch 52 causing energization of the solenoid coil 84 for a period of time long enough that that authorized person may operate the door latch mechanism 18 and open the door 16 for entrance into the secure area.

According to the present invention, therefore, an electrically actuated switch combinated operating device is provided which is, in effect, an electrically actuated switch combinated combination lock and such device or lock may be constructed in virtually any degree of sophistication to provide equivalent degrees of security. With the particular embodiment of the device shown and described herein, a relatively great degree of security is provided in view of the fact that not only must the nonsecure switches 28 through 36 be operated in an exact predetermined sequence in order that the combination may be properly set, but the timer formed by the timer circuit portion of the overall circuitry automatically sets a predetermined time period within which such nonsecure switches 28 through 36 must be properly operated in their predetermined sequence and the particular door latch mechanism 18 must be operated. If, at any time during such nonsecure switch operation or even after such proper operation and prior to the door latch mechanism 18 being operated the time period expires, the entire circuitry will return to its original state and the combination setting must again be restarted.

Furthermore, with the embodiment of electrical and electronic circuitry herein shown and described, the device of the present invention has repeatable capacity. By this is meant that any presettable and multiple positionable switches used in the system may be set all exactly the same, all different, or part the same and part different so that the choice of combination is determined by the number of positions for each switch and the overall number of such switches. In the particular embodiment shown and described herein, the secure switches 42 through 50 may each be set to any one of their five settings, all the same, all different, or some the same and some different. As was illustrated, the particular illustrated settings of the nonsecure switches 42 through 50 made use of the numeral 2 in the combination at three occasions and such numeral was still required to be applied in the proper sequence.

Still further, with the electrically actuated switch combinated operating device of the present invention, whether in the sophisticated form illustrated or in one of the more simpler forms obvious to those skilled in the art, the combination setting required for operating the device and permitting operation of an operating device, such as the electrically energized solenoid coil 84, or the energization of such coil for permitting the operation of various mechanisms, such as the door latch mechanism 18, may be altered at any time merely by an alteration of the settings of any one or more of the secure switches, in the particular embodiment shown, the secure switches 42 through 50. Such alteration can be accomplished in a matter of seconds and does not require the part alteration and replacement of lock cylinder pins or lock tumblers usually requiring a disassembly of the particular lock mechanism as has been true of the various forms of locks of the prior art. Thus, the electrically actuated combination locks formed by the various principles of the present invention are readily adaptable in any degree of simplicity or sophistication for use in replacement of the various prior key operated and combination operated locks, solving one of the major problems with these prior constructions.

We claim:

1. In an electrically actuated switch combinated operating device for permitting operation of certain mechanisms; the combination of: a plurality of selectively operable nonsecure switches capable of location operable by a person seeking to operate an operating device; a plurality of multiple positionable and presettable secure switches capable of location nonaccessible to said person during said nonsecure switch operation by said person, said secure switches each being preset to a selected one of said multiple positions of that said secure switch; an electrically actuated device operable upon electrical power being directed thereto; and electrical circuit means including electronic component means and reset means, said electrical circuit means being operably connected to all of said nonsecure and secure switches and said electrically actuated device, said electrical circuit means through said electronic component means being sensitive to an exact required predetermined sequential operation of at least certain of said nonsecure switches as directly determined by said preset selected positions of all of said secure switches and through said secure switches as a result of initiation and complete carrying through of said exact required predetermined sequential certain nonsecure switch operation permitting through said electronic component means direction of electrical power to said electrically actuated device, said reset means being integrated into said electrical circuit means sensitive to operation of any of said nonsecure switches other than said operation of said certain nonsecure switches in said exact predetermined sequential operation for resetting said electrical circuit means to require reinitiation and complete carrying through of said operation of said certain nonsecure switches in said exact predetermined sequential operation before said permitting of said direction of electrical power to said electrically actuated device upon any of said nonsecure switches being operated other than said operation of said certain nonsecure switches in said exact predetermined sequential operation.

2. An electrically actuated switch combinated operating device as defined in claim 1 in which timer means is operably connected into said electrical circuit means for energization upon said exact required predetermined sequential operation of a first of said certain nonsecure switches in said sequence and always limiting the maximum amount of time thereafter during which a remainder of said certain nonsecure switches may be operated according to said exact required predetermined sequential operation and said electrical power may be directed to said electrically actuated device regardless of which of said nonsecure switches are operated after said energization, said timer means overriding said electrical circuit means sensitivity at lapse of said maximum time and preventing said direction of said electrical power to said electrically actuated device.

3. An electrically actuated switch combinated operating device as defined in claim 1 in which said electrically actuated device is an electrically actuated solenoid device operably connected to a latch mechanism normally blocking operation of said latch mechanism to withdraw a bolt thereof in nonactuated position, said solenoid device being actuated upon electrical power being directed thereto and moved to a latch nonblocking position permitting bolt withdrawing operation of said latch.

4. An electrically actuated switch combinated operating device as defined in claim 1 in which said electrical circuit means includes electrical circuits connecting each one of said nonsecure switches to one of said multiple positions of each of said secure switches, each of said multiple positions of each of said secure switches being connected to a different of said nonsecure switches, a plurality of first electronic component means forming a part of said electronic component means with there being a different of said first electronic component means connected to an output of each of said secure switches, at least one second electronic component means forming a part of said electronic component means connected to outputs of all of said first electronic component means and actionable upon actuation of all of said first electronic component means, said first electronic component means requiring through said selected positioning of said secure switches operation of said certain nonsecure switches in said predetermined sequence for said actuation of all of said first electronic component means, said second electronic component means upon actuation thereof permitting said direction of said electrical power to said electrically actuated device; and in which said first electronic component means are constructed and arranged permitting said predetermined sequence of operation of said certain nonsecure switches to include multiple operation of any of said nonsecure switches as determined by said selected positioning of said secure switches.

5. An electrically actuated switch combinated operating device as defined in claim 1 in which said electrical circuit means includes electrical circuits connecting each one of said nonsecure switches to one of said multiple positions of each of said secure switches, each of said multiple positions of each of said secure switches being connected to a different of said nonsecure switches, a plurality of first electronic component means forming a part of said electronic component means, there being at least one of said first electronic component means for each of said secure switches and having an input thereof connected to that particular of said secure switches, at least one second electronic component means forming a part of said electronic component means and having an input thereof connected to outputs of all of said first electronic component means, said reset means including third electronic component means connected to other inputs of all of said first electronic component means and an output of said second electronic component means, said second electronic component means requiring actuation of all of said first electronic component means for actuation thereof, actuation of said second electronic component means through said reset means third electronic component means permitting said direction of said electrical power to said electrically actuated device, said reset means third electronic component means requiring actuation of said first electronic component means through said secure switches by operation of said certain nonsecure switches in said predetermined sequence and automatically returning all of said electronic component means to original nonactuated condition upon operation of any of said nonsecure switches including said certain and any other of said nonsecure switches out of said predetermined sequence.

6. An electrically actuated switch combinated operating device as defined in claim 1 in which said electrical circuit means includes electrical circuits connecting each one of said nonsecure switches to one of said multiple positions of each of said secure switches, each of said multiple positions of each of said secure switches being connected to a different of said nonsecure switches, a plurality of first electronic component means forming a part of said electronic component means, there being at least one of said first electronic component means for each of said secure switches and having an input thereof connected to that particular of said secure switches, at least one second electronic component means forming a part of said electronic component means and having an input thereof connected to outputs of all of said first electronic component means said reset means including third electronic component means connected to other inputs of all of said first electronic component means and an output of said second electronic component means, said second electronic component means requiring actuation of all of said first electronic component means for actuation thereof, actuation of said second electronic component means through said reset means third electronic component means permitting said direction of said electrical power to said electrically actuated device, said reset means third electronic component means requiring actuation of said first electronic component means through said secure switches by operation of said certain nonsecure switches in said predetermined sequence and returning all of said electronic component means to original nonactuated condition upon operation of any of said nonsecure switches including said certain and any other of said nonsecure switches out of said predetermined sequence, timer means connected to said secure switches actionable upon a correct sequential operation of a first of said certain nonsecure switches in said sequence for determining a maximum period of time upon actuation thereof and returning all of said electronic component means to nonactuated conditions upon expiration of said maximum period of time regardless of which of said nonsecure switches are operated after said timer means actuation by said correct sequential operation of said first of said certain nonsecure switches in said sequence.

7. In an electrically actuated switch combinated operating device for permitting operation of certain mechanisms; the combination of: a plurality of selectively operable nonsecure switches capable of location operable by a person seeking to operate an operating device; a plurality of multiple positionable and presettable secure switches capable of location nonaccessible to said person during said nonsecure switch operation by said person, said secure switches each being preset to a selected one of said multiple positions of that said secure switch; an electrically actuated device operable upon electrical power being directed thereto; first electrical circuit means including electronic component means, said first electrical circuit means being operably connected to each of said nonsecure and secure switches; second electrical circuit means operably connected to said first electrical circuit means and said electrically actuated device, said second electrical circuit means including blocking means normally interrupting a flow of electrical power therein and to said electrically actuated device when nonenergized and permitting said flow of said electrical power therein and to said electrically actuated device when energized; said first electrical circuit means through said electronic component means permitting energization of said second circuit blocking means only upon an initiation and complete carrying through of an exact required predetermined sequential operation of at least certain of said nonsecure switches as directly determined by said preset selected positions of said secure switches; and reset means operably connected to at least one of said first and second electrical circuit means and being sensitive to operation of any of said nonsecure switches other than said operation of said certain nonsecure switches in said exact predetermined sequential operation for resetting said electronic component means of said first electrical circuit means to require reinitiation and complete carrying through of said operation of said certain nonsecure switches in said exact predetermined sequential operation before said permitting of said energization of said second circuit blocking means upon any of said nonsecure switches being operated other than said operation of said certain nonsecure switches in said exact predetermined sequential operation.

8. An electrically actuated switch combinated operating device as defined in claim 7 in which timer means is operably connected to certain of said first and second electrical circuit means for energization of said timer means upon operation of a correct first of said certain nonsecure switches in said sequence said timer means upon energization thereof limiting the maximum period of time during which said second circuit blocking means may be energized permitting said flow of said electrical power to said electrically actuated device regardless of which of said nonsecure switches are operated after said energization, said timer means upon lapse of said maximum period of time preventing any of said flow of said electrical power to said electrically actuated device.

9. An electrically actuated switch combinated operating device as defined in claim 7 in which said electrically actuated device includes an electrically actuated solenoid device operable upon electrical power being directed thereto, said electrically actuated solenoid device being positioned normally blocking operation of a latch to withdraw an extended bolt thereof and being free of blocking operation of said latch to withdraw said extended bolt upon operation thereof by said electrical power being directed thereto.

10. An electrically actuated switch combinated operating device as defined in claim 7 in which said first electrical circuit means includes electrical circuits connecting each of a plurality of said nonsecure switches to one of said multiple positions of each of a plurality of said secure switches, each of said multiple positions of said secure switches connected to said nonsecure switches being connected to a different of said nonsecure switches for that particular of said secure switches, said electronic component means including a plurality of electronic component means, certain of said electronic component means being connected each to a different one of said secure switches and being actionable through said secure switches by said operation of said certain nonsecure switches in said predetermined sequence, other of said electronic component means forming said reset means and being connected to said certain electronic component means and requiring actuation of said certain electronic component means in a predetermined sequence for energization of said second circuit blocking means through said other electronic component means upon actuation of all of said certain electronic means, said other electronic component means interrupting said first electrical circuit means and returning all of said certain electronic component means to original nonactuated conditions upon any actuation of any of said certain electronic component means not in said predetermined sequence.

11. An electrically actuated switch combinated operating device as defined in claim 7 in which said first electrical circuit means includes electrical circuits connecting each of said nonsecure switches to one of said multiple positions of each of said secure switches, each of said multiple positions of each of said secure switches being connected to a different of said nonsecure switches, said electronic component means including a plurality of first electronic component means and a plurality of second electronic component means, each of said first electronic component means being connected to a different of said secure switches and being actionable through said secure switches by said operation of said certain nonsecure switches as directly determined by said preset selected positions of said secure switches, said second electronic component means forming said reset means and being connected to each of said first electronic component means and requiring actuation of said first electronic component means in a predetermined sequence for actuation of said second electronic component means, said second electronic component means upon actuation thereof permitting said energization of said second circuit blocking means and said flow of said electrical power to said electrically actuated device, said second electronic component means upon actuation of any of said first electronic component means out of said predetermined sequence returning all of said electronic component means to original nonactuated condition effectively preventing said energization of said second circuit blocking means, timer means operably connected to said first electronic component means actuated by an actuation of an initial of said first electronic component means through operation of a correct first of said certain nonsecure switches in said sequence, said timer means upon initial actuation thereof thereafter determining a maximum period of time within which said energization of said second circuit blocking means may be permitted and returning all of said electronic component means to original nonactuated condition upon said period of time expiring regardless of which of said nonsecure switches are operated after said timer means initial actuation.

12. An electrically actuated switch combinated operating device as defined in claim 7 in which said first electrical circuit means includes electrical circuits connecting each of said nonsecure switches to one of said multiple positions of each of said secure switches, each of said multiple positions of each of said secure switches being connected to a different of said nonsecure switches, said electronic component means including a plurality of first electronic component means and a plurality of second electronic component means, each of said first electronic component means being connected to a different of said secure switches and being actionable through said secure switches by said operation of said certain nonsecure switches as directly determined by said preset selected positions of said secure switches, said second electronic component means forming said reset means and being connected to each of said first electronic component means and requiring actuation of said first electronic component means in a predetermined sequence for actuation of said second electronic component means, said second electronic component means upon actuation thereof permitting said energization of said second circuit blocking means and said flow of said electrical power to said electrically actuated device, said second electronic component means upon actuation of any of said first electronic component means out of said predetermined sequence returning all of said electronic component means to original nonactuated condition effectively preventing said energization of said second circuit blocking means; and in which said second circuit blocking means includes electronic blocking means normally electronically blocking said flow of electrical power therein and to said electrically actuated device when nonenergized and permitting said flow of said electrical power therethrough and to said electrically actuated device when energized.

13. An electrically actuated switch combinated operating device as defined in claim 7 in which said first electrical circuit means includes electrical circuits connecting each of said nonsecure switches to one of said multiple positions of each of said secure switches, each of said multiple positions of each of said secure switches being connected to a different of said nonsecure switches, said electronic component means including a plurality of first electronic component means and a plurality of second electronic component means, each of said first electronic component means being connected to a different of said secure switches and being actionable through said secure switches by said operation of said certain nonsecure switches as directly determined by said preset selected positions of said secure switches, said second electronic component means forming said reset means and being connected to each of said first electronic component means and requiring actuation of said first electronic component means in a predetermined sequence for actuation of said second electronic component means, said second electronic component means upon actuation thereof permitting said energization of said second circuit blocking means and said flow of said electrical power to said electrically actuated device, said second electronic component means upon actuation of any of said first electronic component means out of said predetermined sequence returning all of said electronic component means to original nonactuated condition effectively preventing said energization of said second circuit blocking means, timer means operably connected to said first electronic component means actuated by an actuation of an initial of said first electronic component means through operation of a correct first of said certain nonsecure switches in said sequence, said timer means upon initial actuation thereof thereafter determining a maximum period of time within which said energization of said second circuit blocking means may be permitted and returning all of said electronic component means to original nonactuated condition upon said period of time expiring regardless of which of said nonsecure switches are operated after said timer means initial actuation; and in which said second circuit blocking means is electronic blocking means normally electronically blocking said flow of electrical power therethrough and to said electrically actuated device when nonenergized and permitting said flow of said electrical power therethrough and to said electrically actuated device when energized.

14. An electrically actuated switch combinated operating device as defined in claim 7 in which said first electrical circuit means includes electrical circuits connecting each of said nonsecure switches to one of said multiple positions of each of said secure switches, each of said multiple positions of each of said secure switches being connected to a different of said nonsecure switches, said electronic component means including a plurality of first electronic component means and a plurality of second electronic component means, each of said first electronic component means being connected to a different of said secure switches and being actionable through said secure switches by said operation of said certain nonsecure switches as directly determined by said preset selected positions of said secure switches, said second electronic component means forming said reset means and being connected to each of said first electronic component means and requiring actuation of said first electronic component means in a predetermined sequence for actuation of said second electronic component means, said second electronic component means upon actuation thereof permitting said energization of said second circuit blocking means and said flow of said electrical power to said electrically actuated device, said second electronic component means upon actuation of any of said first electronic component means out of said predetermined sequence returning all of said electronic component means to original nonactuated condition effectively preventing said energization of said second circuit blocking means, timer means operably connected to said first electronic component means actuated by an actuation of an initial of said first electronic component means through operation of a correct first of said certain nonsecure switches in said sequence, said timer means upon initial actuation thereof thereafter determining a maximum period of time within which said energization of said second circuit blocking means may be permitted and returning all of said electronic component means to original nonactuated condition upon said period of time expiring regardless of which of said nonsecure switches are operated after said timer means initial actuation; in which said second circuit blocking means is electronic blocking means normally electronically blocking said flow of electrical power therethrough and to said electrically actuated device when nonenergized and permitting said flow of said electrical power therethrough and to said electrically actuated device when energized; and in which said electrically actuated device includes an electrically actuated solenoid device operable upon electrical power being directed thereto, said electrically actuated solenoid device being positioned normally blocking operation of a latch to withdraw an extended bolt thereof and being free of blocking operation of said latch to withdraw said extended bolt upon operation thereof by said electrical power being directed thereto.

* * * * *